(12) United States Patent
Kiselev

(10) Patent No.: US 8,001,085 B1
(45) Date of Patent: Aug. 16, 2011

(54) REMOTE DATA ACCESS FOR LOCAL OPERATIONS

(75) Inventor: Oleg Kiselev, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1804 days.

(21) Appl. No.: 10/722,701

(22) Filed: Nov. 25, 2003

(51) Int. Cl.
G06F 7/00 (2006.01)
G06F 17/00 (2006.01)

(52) U.S. Cl. ......................................... 707/639; 707/649
(58) Field of Classification Search .................. 707/202, 707/639, 649; 714/6
See application file for complete search history.

(56) References Cited

U.S. PATENT DOCUMENTS

| | | | | |
|---|---|---|---|---|
| 4,805,134 | A | 2/1989 | Calo et al. ...................... | 364/900 |
| 5,155,845 | A | 10/1992 | Beal et al. ...................... | 395/575 |
| 5,175,849 | A | 12/1992 | Schneider ...................... | 395/600 |
| 5,974,563 | A | 10/1999 | Beeler, Jr. .......................... | 714/5 |
| 6,094,654 | A | 7/2000 | Van Huben et al. .............. | 707/8 |
| 6,377,959 | B1 * | 4/2002 | Carlson .......................... | 707/202 |
| 6,643,671 | B2 | 11/2003 | Milillo et al. ................. | 707/204 |
| 6,691,245 | B1 * | 2/2004 | DeKoning .................... | 714/6.31 |
| 2002/0194525 | A1 | 12/2002 | Mathiske et al. ................. | 714/5 |
| 2003/0031176 | A1 | 2/2003 | Sim ............................... | 370/392 |
| 2003/0091267 | A1 | 5/2003 | Alvarez et al. .................. | 385/16 |
| 2003/0097611 | A1 | 5/2003 | Delaney et al. ................. | 714/13 |
| 2003/0131278 | A1 | 7/2003 | Fujibayashi ...................... | 714/6 |
| 2003/0149736 | A1 | 8/2003 | Berkowitz et al. ............ | 709/213 |
| 2003/0208638 | A1 | 11/2003 | Abrams, Jr. et al. .......... | 709/328 |
| 2004/0010487 | A1 | 1/2004 | Prahlad et al. ..................... | 707/1 |
| 2004/0172509 | A1 * | 9/2004 | Takeda et al. ................. | 711/162 |

* cited by examiner

*Primary Examiner* — Apu M Mofiz
*Assistant Examiner* — Chelcei Daye
(74) *Attorney, Agent, or Firm* — Campbell Stephenson LLP

(57) ABSTRACT

A method, system, and computer-readable medium to maintain consistent, up-to-date copies of primary data. Primary data is maintained on a primary node, and point-in-time snapshots of the primary data are maintained on a secondary or remote node. Read operations can be directed to read some or all data from the remote node. When part of the data on the primary node becomes unavailable due to corruption, device failure, or communication failure, unavailable data can be read from the secondary node. When the determination is made that an unavailable portion of the data exists, a third data storage accessible by the first host can be created. Each subsequent change to the data in the first data storage can be written only to the third data storage. If an updated portion of the data is to be read, the updated portion can be read from the third data storage.

21 Claims, 10 Drawing Sheets

System Structure

Overlay Snapshot

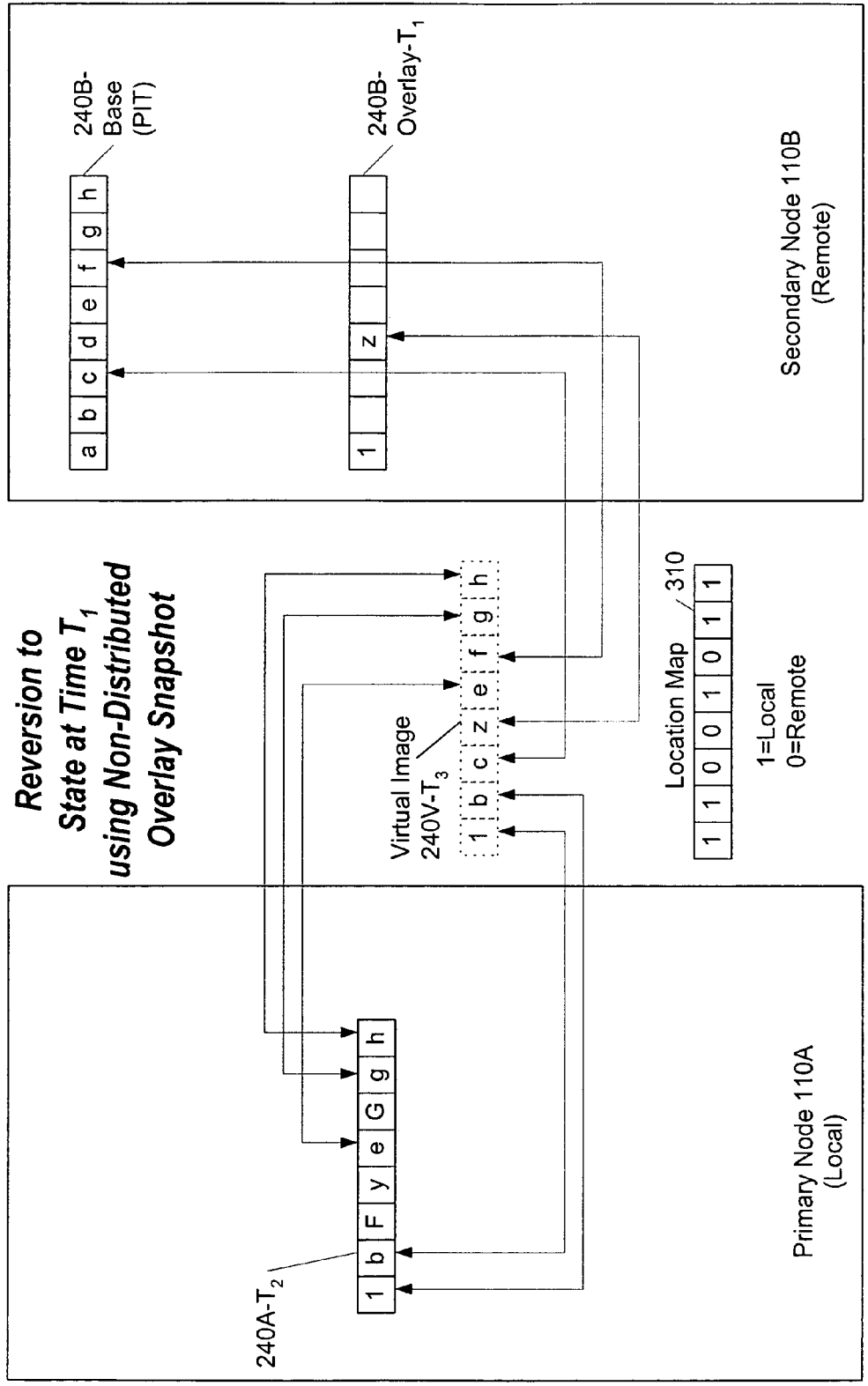

Configuration with
Distributed Overlay Snapshot

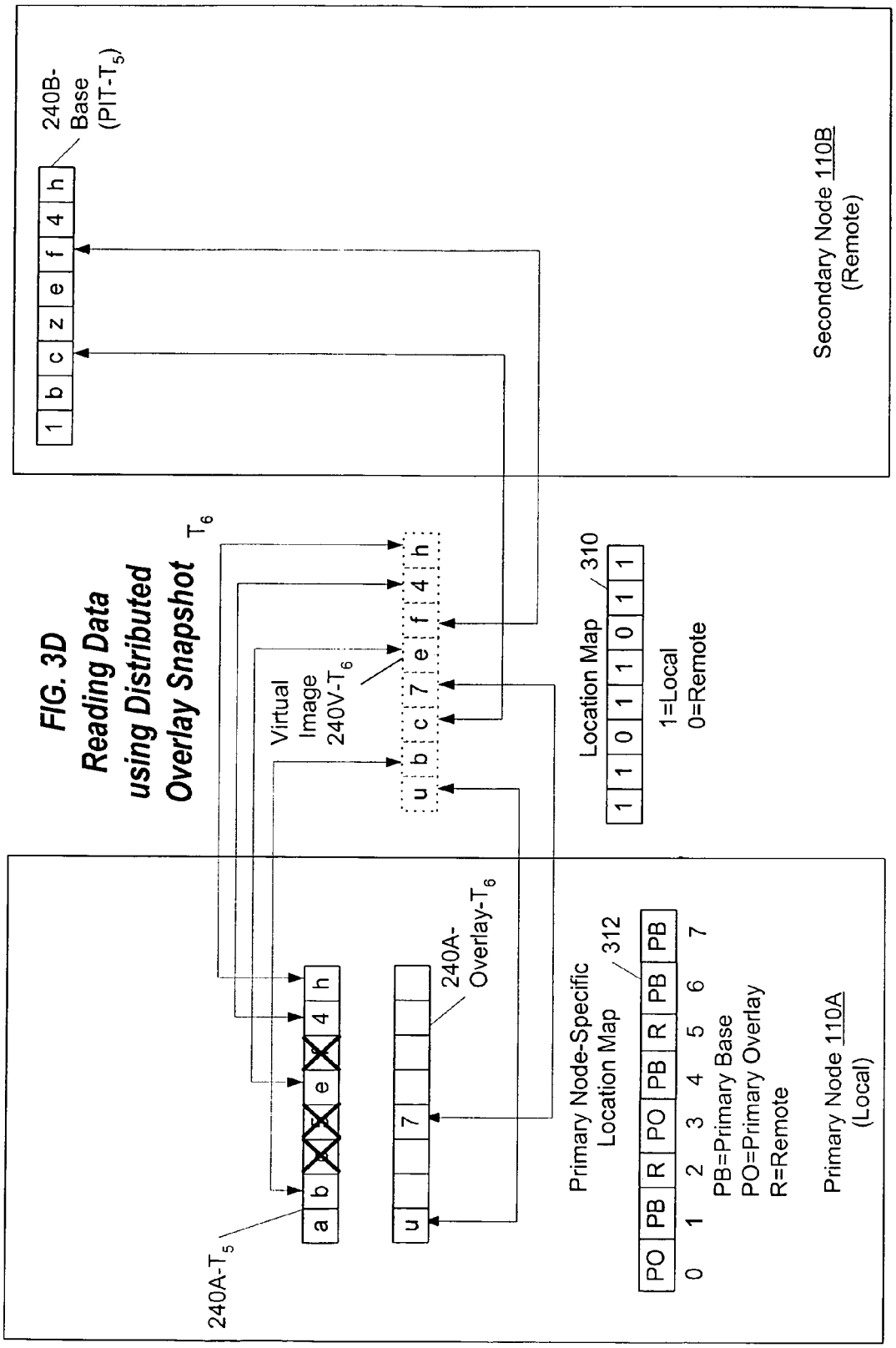

REMOTE DATA ACCESS FOR LOCAL OPERATIONS

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. For businesses that increasingly depend on data and information for their day-to-day operations, unplanned downtime due to data loss or data corruption can hurt their reputations and bottom lines. Data corruption and loss can occur when software or equipment malfunctions, when administrators make mistakes, and when systems and data are deliberately attacked.

Deliberate attacks on systems and data can be made by hackers exploiting security flaws, by disgruntled employees settling scores, and even by deliberate industrial sabotage. The FBI reports that millions of dollars are lost each year as a result of attacks by intruders and software programs such as viruses and worms. In the "2003 Computer Crimes and Security Survey" of 530 corporations, each successful attack cost corporations an average of $2.7 million in theft of proprietary information. The losses include lost data, employee time used in recovering data, delays in existing projects, and damage to equipment. Of the companies surveyed, 35% reported denial-of-service attacks, 36% reported infiltration and vandalism attacks, 6% reported theft of transaction information, 4% reported financial fraud, and 19% reported other types of attacks and misuse.

Businesses are becoming increasingly aware of the costs imposed by data corruption and loss and are taking measures to plan for and recover from such events. Often these measures include making backup copies of primary, or production, data, which is 'live' data used for operation of the business. Backup copies of primary data are made on different physical storage devices, and often at remote locations, to ensure that a version of the primary data is consistently and continuously available.

Backup copies of data are preferably updated as often as possible so that the copies can be used in the event that primary data are corrupted, lost, or otherwise need to be restored. One way to achieve consistency and avoid data loss is to ensure that every update made to the primary data is also made to the backup copy, preferably in real time. Often such "duplicate" updates are made on one or more "minor" copies of the primary data by the same application program that manages the primary data. Maintaining one or more mirrored copies of the primary data requires the allocation of additional storage space to store each mirrored copy. In addition, maintaining mirrored copies requires processing resources of the application and the computer system hosting the application (often referred to as a host or node) to make each update to the primary data multiple times, once for each mirrored copy. Mirrored copies of the data are typically maintained on devices attached to or immediately accessible by the primary node to avoid delays inherent in transferring data across a network or other replication link to a secondary node and processing the data at the secondary node.

In addition to maintaining mirrored copies of primary data locally, primary data are often replicated to remote sites across a network. A copy of the primary data is made and stored at a remote location, and the replica is updated by propagating any changes to the primary data to the backup copy. If the primary data are replicated at different sites, and if the failure of the systems storing the data at one site is unlikely to cause the failure of the corresponding systems at another site, replication can provide increased data reliability. Thus, if a disaster occurs at one site, an application that uses that data can be restarted using a replicated copy of the data at another site.

Replication of data can be performed synchronously, asynchronously, or periodically. With synchronous replication, an update is posted to the secondary node and acknowledged to the primary node before completing the update at the primary node. In the event of a disaster at the primary node, data can be recovered from the secondary node without loss because the copies of the data at the primary and secondary nodes contain the same data.

With asynchronous replication, updates to data are immediately reflected at the primary node and are persistently queued to be forwarded to each secondary node. Data at the secondary node therefore lags behind data at the primary node. Asynchronous replication enables application programs to process data more quickly, as no delay is incurred waiting for secondary nodes to receive changes to data and acknowledge their receipt. Upon failure of the primary node, however, the secondary nodes cannot be assumed to have an up-to-date version of the primary data. A decision regarding whether to replicate data synchronously or asynchronously depends upon the nature of the application program using the data as well as numerous other factors, such as available bandwidth, network round-trip time, the number of participating servers, and the amount of data to be replicated.

Another method of replication is to replicate copies of data periodically, rather than copying the result of each update transaction. Periodic replication is in contrast to asynchronous and synchronous replication, each of which continuously replicates data. In periodic replication, changed data resulting from groups of update transactions are transmitted at a fixed time interval or based upon the occurrence of an event. To avoid copying the entire data volume each time, "snapshots" of the data volume are taken and regions containing data changed are tracked. Only the regions of data changed after the snapshot was taken are transmitted to the secondary node.

In some implementations of replication, instructions for modifying data are transmitted to the secondary node rather than replicating the changed data itself. For example, these instructions may be commands for performing database or file system operations that are performed on a copy of the data at the secondary node. Alternatively, these instructions can be derived by calculating differences between data on the primary and secondary nodes and generating instructions to synchronize the data.

A replica that faithfully mirrors the primary currently is said to be synchronized or "in sync;" otherwise, the replica is said to be unsynchronized, or "out of sync." An out of sync replica may be synchronized by selectively or completely copying certain blocks from the primary; this process is called synchronization or resynchronization.

Even in a protection scheme including both mirroring and replication of primary data, primary data are not completely safe from corruption. For example, a breach of security of the primary node typically will enable an attacker to access and corrupt all resources accessible from the primary node, including the mirrored copies of data. Furthermore, when primary data are corrupted and the result of the update corrupting the primary data is replicated to secondary nodes hosting backup copies of the data, all copies of the data are corrupted. "Backing out" the corrupted data and restoring the primary data to a previous state is required on every copy of the data that has been made.

Previously, this problem has been solved by restoring the primary data from a "snapshot" copy of the data made before the primary data were corrupted. Once the primary data are restored, the entire set of primary data is copied to each backup copy to ensure consistency between the primary data and backup copies. Only then can normal operations, such as updates and replication, of the primary data resume. When terabytes of primary data are involved, the restoration process is lengthy and the downtime to businesses is very expensive.

What is needed is the ability to maintain consistent, up-to-date copies of primary data that are protected from corruption and that enable quick resumption of operations upon discovery of corruption of the primary data or failure of the primary node.

SUMMARY OF THE INVENTION

The present invention provides the ability to maintain consistent, up-to-date copies of primary data that are protected from corruption and that enable quick resumption of operations upon discovery of corruption of the primary data or failure of the primary node. Primary data is maintained on a primary node, and point-in-time snapshots of the primary data are maintained on a secondary or remote node. Read operations involve requesting some or all data to be read from a secondary host having access to the secondary data storage.

When part of the data on the primary node becomes unavailable for reading due to corruption, device failure, or communication failure, the unavailable data can be requested from the secondary host. A previous version of the data that has become unavailable because the data have been overwritten on the primary data storage can also be requested from the secondary host. When the determination is made that some of the data is unavailable, a third data storage accessible by the primary host can be created. Each subsequent change to the data in the primary data storage can be written to the third data storage. If an updated portion of the data is to be read, the updated portion can be read from the third data storage.

Reading different portions of the data from two different nodes enables operations to continue and data to remain available despite the unavailability of the data on the primary node. Furthermore, multiple virtual images of the data can be constructed using different point-in-time snapshots and overlay objects to test various recovery scenarios before restoring the primary data storage.

BRIEF DESCRIPTION OF THE DRAWINGS

The present invention may be better understood, and its numerous objectives, features, and advantages made apparent to those skilled in the art by referencing the accompanying drawings.

FIG. 3B shows an example of the data produced when reconstructing primary data using the traditional overlay snapshots of FIG. 3A after discovery that a portion of the primary data is corrupted.

FIG. 3D shows a technique for reading data using the distributed overlay snapshot of FIG. 3C.

The use of the same reference symbols in different drawings indicates similar or identical items.

DETAILED DESCRIPTION

Figure 1:
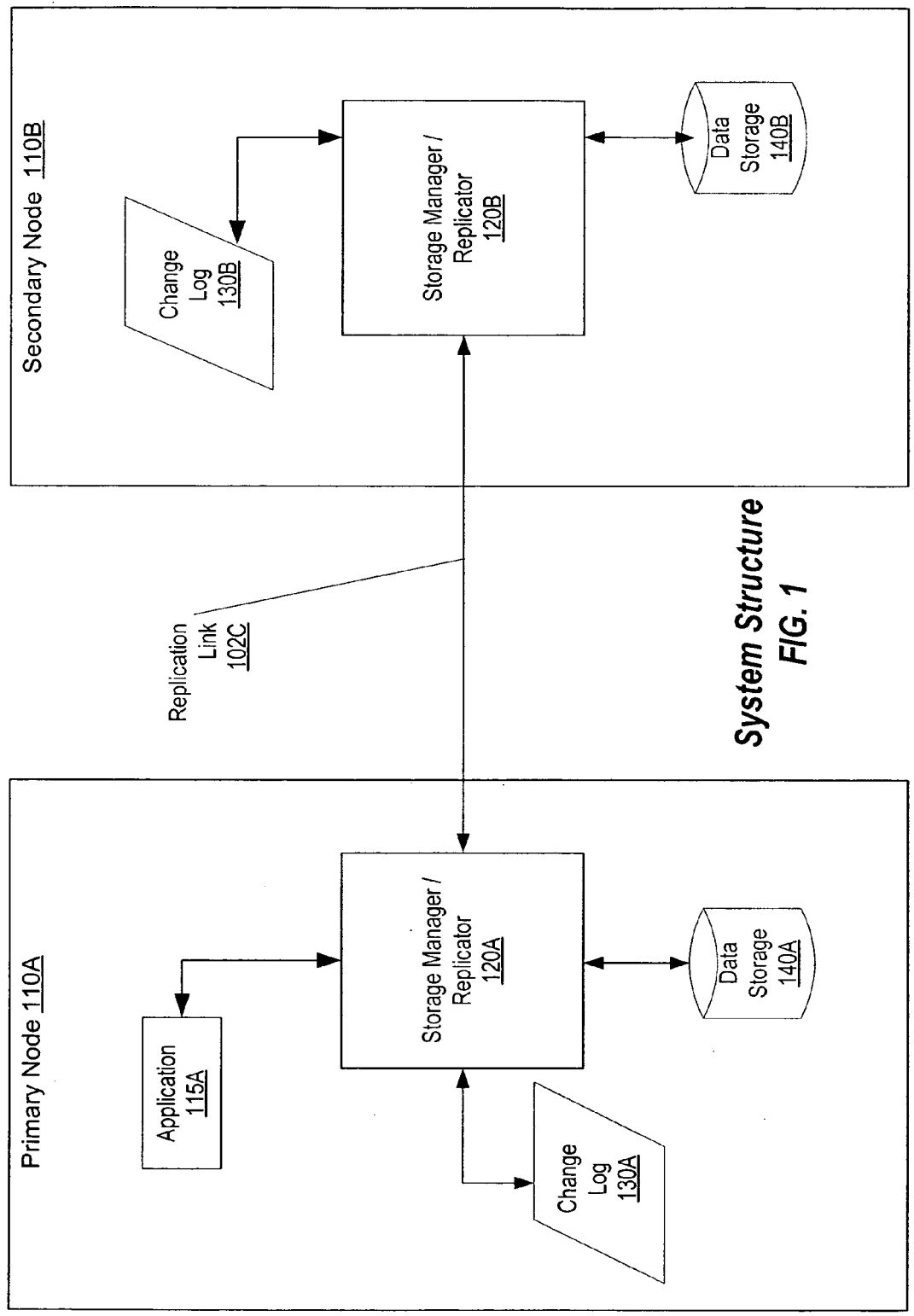
FIG. 1 shows an example of a system configured to operate in accordance with the present invention.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Terminology

The terms "consistent" and "consistency" are used herein to describe a backup copy of primary data that is either an exact copy of the primary data or an exact copy of primary data as the primary data existed at a previous point in time. The terms "write operation" and "update operation" are used interchangeably to describe making a change to data. The term "change" when used with reference to data includes adding new data as well as updating existing data.

Data storage may take form as groups of one or more physical devices, such as one or more dynamic or static random access storage devices, one or more magnetic or optical data storage disks, or one or more other types of storage devices. With respect to backup copies of primary data, preferably the backup storage devices are direct access storage devices such as disks rather than sequential access storage devices such as tapes. Because disks are often grouped to form a logical storage volume that is used to store backup copies of primary data, the terms "storage" and "data storage" are used interchangeably herein with "storage volume;" however, one of skill in the art will recognize that the systems and processes described herein are also applicable to other types of storage and that the use of the term "storage volume" is not intended to be limiting. A storage volume storing the primary data is referred to herein as a primary volume, and a storage volume storing a backup copy of the primary data is referred to herein as a backup volume, secondary volume, or remote volume. A storage volume storing a snapshot of data is referred to herein as a snapshot volume.

The terms "host" and "node" are used interchangeably to describe computer systems, which are described in the discussion of FIG. 4 below. A node in a network managing the primary data/volume is referred to herein as a primary node, and a node in the network maintaining backup copies of the primary data but not the primary data itself is referred to herein as a secondary, backup, or remote node.

Introduction

The present invention provides the ability to maintain consistent, up-to-date copies of primary data that are protected from corruption and that enable quick resumption of operations upon discovery of corruption of the primary data or failure of the primary node. Primary data is maintained on a primary node, and point-in-time snapshots are maintained on a secondary or remote node.

When a request to read a portion of the data in the primary data storage is received, a request can be made from a secondary host for a requested portion of a copy of the data in secondary data storage. The requested portion may include some or all of the data in the secondary data storage or some or all of the data in the portion of the data requested in the read request. Reading the portion of the data includes reading the requested portion received from the secondary host.

If a sub-portion of the portion of the data to be read was not included in the requested portion and is available from the first data storage, reading the portion of the data also includes reading the sub-portion from the primary data storage. When part of the data on the primary node becomes unavailable for reading due to corruption, device failure, or communication failure, the unavailable data can be included in the requested portion requested from the secondary host.

When a determination is made that an unavailable portion of the data exists in the primary data storage, a third data storage (also referred to as an overlay object) accessible by the primary host can be created. Each subsequent change to the data in the first data storage can be written to the third data storage. If an updated portion of the portion of the data is to be read, the updated portion can be read from the third data storage.

The combination of the data from the primary and secondary nodes is referred to as a distributed overlay snapshot. A complete image of the data in the distributed overlay snapshot may not be completely stored on either the primary or the secondary node, but rather can be constructed as a virtual image of the data from portions of the data stored on both nodes.

Reading different portions of the data from two different nodes enables operations to continue and data to remain available despite the unavailability of the data on the primary node. Furthermore, multiple virtual images of the data can be constructed using different point-in-time snapshots and overlay objects to test various recovery scenarios before restoring the primary data storage.

System Structure

FIG. 1 shows an example of a system environment in which the present invention may operate. Two nodes are shown, primary node 110A and secondary node 110B. Software programs application 115A and storage manager/replicator 120A operate on primary node 110A. Application 115A manages primary data that can be stored in change log 130A and data storage 140A.

Change log 130A can be considered to be a "staging area" to which changes to data are written before being written to data storage 140A. Change logs such as change log 130A, also referred to simply as logs, are known in the art and can be implemented in several different ways; for example, an entry in the log may represent an operation to be performed on a specified region of the data. Alternatively, the log may be structured to maintain a set of operations with respect to each region. Other types of log structures are also possible, and no particular type of implementation of change logs is required for operation of the invention. The invention can be practiced without using a log, although using a log is preferable in embodiments that use typical magnetic disk storage and cannot rely on availability of a large amount of non-volatile solid-state storage (NVRAM).

Storage manager/replicator 120A intercepts write operations to primary data by application 115A and replicates changes to the primary data to secondary node 110B. The type of replication performed by storage manager/replicator 120A can be synchronous, asynchronous, and/or periodic, as long as updates are applied consistently to both the primary and secondary data storage. While application 115A and storage manager/replicator 120A may run on the same computer system, such as primary node 110A, the hardware and software configuration represented by primary node 110A may vary. Application 115A and storage manager/replicator 120A may run on different computer systems, change log 130A may be stored in non-persistent or persistent data storage, and data storage 140A is a logical representation of a set of data stored on a logical storage device which may include one or more physical storage devices. Furthermore, while connections between application 115A, storage manager/replicator 120A, change log 130A, and data storage 140A are shown within primary node 110A, one of skill in the art will understand that these connections are for illustration purposes only and that other connection configurations are possible. For example, one or more of application 115A, storage manager/replicator 120A, change log 130A, and data storage 140A can be physically outside, but coupled to, the node represented by primary node 110A.

Secondary data storage 140B is logically isolated from primary data storage 140A. Storage manager/replicator 120A of primary node 110A communicates over replication link 102C with storage manager/replicator 120B of secondary node 110B. Replication link 102C can be any known communication or networking link, including a shared device used for data transfer between hosts. Secondary node 110B also includes a change log 130B and data storage 140B for storing a replica of the primary data, and similar variations in hardware and software configuration of secondary node 110B are possible.

Because storage manager/replicator 120A is configured to intercept write operations by application 115A to primary data and to replicate the changed data, modifications to primary data made as a result of performing other operations not involving application 115A (such as reformatting disks in data storage 140A) may not be replicated.

Maintenance of Multiple Versions of the Data

A breach of security that enables primary data to be corrupted can result in replication of the corrupted primary data to all backup copies. Additional measures must be taken to ensure that valid and consistent primary data can be recovered when a discovery is made that the primary and backup data have been corrupted. Several techniques are available to preserve previous versions of the data or to enable the reconstruction of a valid version of the data.

These techniques include logging all changes to the known-to-be-stable copy of data without actually applying these changes to that stable copy and constructing a current version of the data from the log and the stable copy. Another technique includes using purely log-based storage such that changes to the data can be selectively applied when a current version of the data is constructed from the log. Yet another technique includes logging new data on the primary node in batches for periodic application to the remote copy and taking a snapshot of the remote copy before every batch update.

The primary and secondary data storage may be configured the same or differently. For example, each data storage area may be configured to store data only in a log; in a log combined with a storage volume; or in a log, storage volume, and a set of one or more snapshots. Preferably, at least the secondary node is configured to maintain multiple versions of the data.

Version management software or hardware. Research efforts to create "self-securing" storage have focused on systems and intelligent devices that store multiple versions of a given unit of data, such as a file or a block. Metadata are maintained for each unit of data to keep track of the versions of that unit of data. For example, if a block A in a file is overwritten, the new contents of the block A can be stored in a newly allocated block A', leaving the original block A intact. A unique identifier for the file that points to block A' rather than A is added to the time-ordered list of versions of the file. However, versioned storage systems and devices are a slower alternative to regular data storage, since metadata are written whenever the data changes. Metadata retrieval and/or update may be needed for every read and write operation if the I/O pattern is sufficiently random.

Data logs. Another approach to enable recovery of previous versions of valid primary data involves logging data on the remote node. Data are written to a log when received at the secondary node and a large number of log updates are maintained in a cache memory. Prior to writing the data from the log into permanent data storage, a snapshot of the permanent data storage is written, and then a cached version of the log data is used to update the permanent data storage. This technique lowers the latency of persistently storing data on the remote node because sequential I/O latency when writing data from the log cache is usually 7-8 times lower than random I/O latency. Furthermore, the cost of maintaining point-in-time copies of the data (snapshots) is lowered because snapshots are taken relatively infrequently.

If data are kept in the log as long as possible, the time ordering of operations is preserved, enhancing the ability to access the state of the data at various points in time. In addition, retaining data in the log eliminates the overhead inherent in very frequent updates to a small number of "hot" blocks with values that repeatedly change. However, a large amount of data in the log results in lengthy crash recovery start-up processing because either an index of the data locations must be constructed, or each entry has to be applied to the main storage volume and its snapshots.

Snapshots. Generally, a snapshot is a copy of data that captures a state of the data at a particular point in time. Various techniques for making "snapshots" of data are known in the art. One technique for creation of snapshots is performed by copying each block from the primary data volume to a corresponding block in a snapshot volume. Block-by-block copying is an expensive and time-consuming operation, however, and the snapshot volume is not available to provide all of the primary data for other operations until a copy of every block is made. Furthermore, access to the primary data on the primary volume is degraded during creation of the snapshot volume.

A technique has been developed for creating "instant" snapshots by Veritas Software Corporation of Mountain View, Calif., that enables both the primary volume and the snapshot volume to be immediately available for input/output operations after the snapshot is made. The instant snapshot volume typically is created as an empty storage object or by including only portions of the data from the primary volume. Other data from the primary volume can be copied in the background while I/O operations are performed on both the primary volume and the snapshot volume. If data are read that have not yet been copied to the snapshot volume, those data are either provided from the primary volume to the reader or first copied to the snapshot volume and then provided to the reader from the snapshot volume. Techniques for creating and using instant snapshots and performing other "instant" operations are described in U.S. patent application Ser. No. 10/143, 059, entitled "Method and Apparatus for Creating a Virtual Data Copy," filed May 10, 2002, and naming as inventors Anand A. Kekre, John A. Colgrove, Oleg Kiselev, Ronald S. Karr, and Niranjan S. Pendharkar, the application being incorporated by reference herein in its entirety for all purposes.

A trade-off is made between the frequency and granularity of snapshots and the rate of recovery after a node failure. The less often snapshots are taken, the greater the amount of data that must be recovered and the slower the recovery. However, as the number of snapshots grows, additional data storage is required to store the snapshots and performance of I/O operations may suffer. As the length of time since a snapshot was taken grows, the probability of that snapshot being useful decreases. One management strategy is to eliminate older snapshots to save space. For example, if snapshots are taken every 5 minutes, after a few hours the older snapshots can be "collapsed" such that several temporally adjacent snapshots are combined (for example snapshots taken at 5, 10 and 15 minutes after the hour can be represented by one snapshot; snapshots taken at 20, 25, and 30 minutes after the hour can be represented by another snapshot, and so on). In this scenario, one synthetic snapshot combines data changes for each 15 minute interval (in this case, for 15 minutes after the hour, 30 minutes, 45 minutes and on the hour), reducing the number of snapshots. As the 15-minute snapshots become older than a day, they can be collapsed into hourly snapshots, and so on. The decision about the number and frequency of snapshots to retain must take into account the information and recovery needs of the organization.

In addition to the number of snapshots to be retained, a management decision must be made about the type(s) of snapshots to retain. One type of snapshot is a "full data" snapshot, in which a complete copy of every region of the corresponding storage volume is made. Another type of snapshot is a "copy-on-write" (COW) snapshot. In a copy-on-write snapshot, before an update to a region of the primary data is made, the previous data in the region is copied to a copy-on-write snapshot. The copy-on-write snapshot typically contains only data for regions that change and is combined with the unchanged regions of the primary volume to provide a complete image of a previous state of the data. This scheme has an advantage that when the oldest snapshots need to be eliminated, no data must be moved from one location to another and the old copy-on-write snapshots can simply be deleted. One disadvantage is that the copy-on-write process is expensive because additional I/O operations are required for every write operation.

Another type of snapshot is referred to as an "overlay" snapshot. Changes to data are written to an empty overlay storage object, and the previous version of the data remains unchanged in the main storage volume. In effect, because the main storage volume does not change, the main storage volume serves as a point-in-time snapshot of the data. This point-in-time snapshot of the main storage volume is combined with one or more overlay storage objects to create a virtual image of the data, which can be referred to as an "overlay snapshot." Note that an overlay snapshot does not physically exist in one data storage location, but rather is constructed as a virtual image when needed. This technique enables the integrity of an earlier image of the data to be preserved, while allowing fast write operations. Multiple overlay storage objects can be created to capture the state of the data in the main storage volume at different points in time. Overlay snapshots are further discussed with reference to FIGS. 2 and 3A through 3E.

Figure 2:
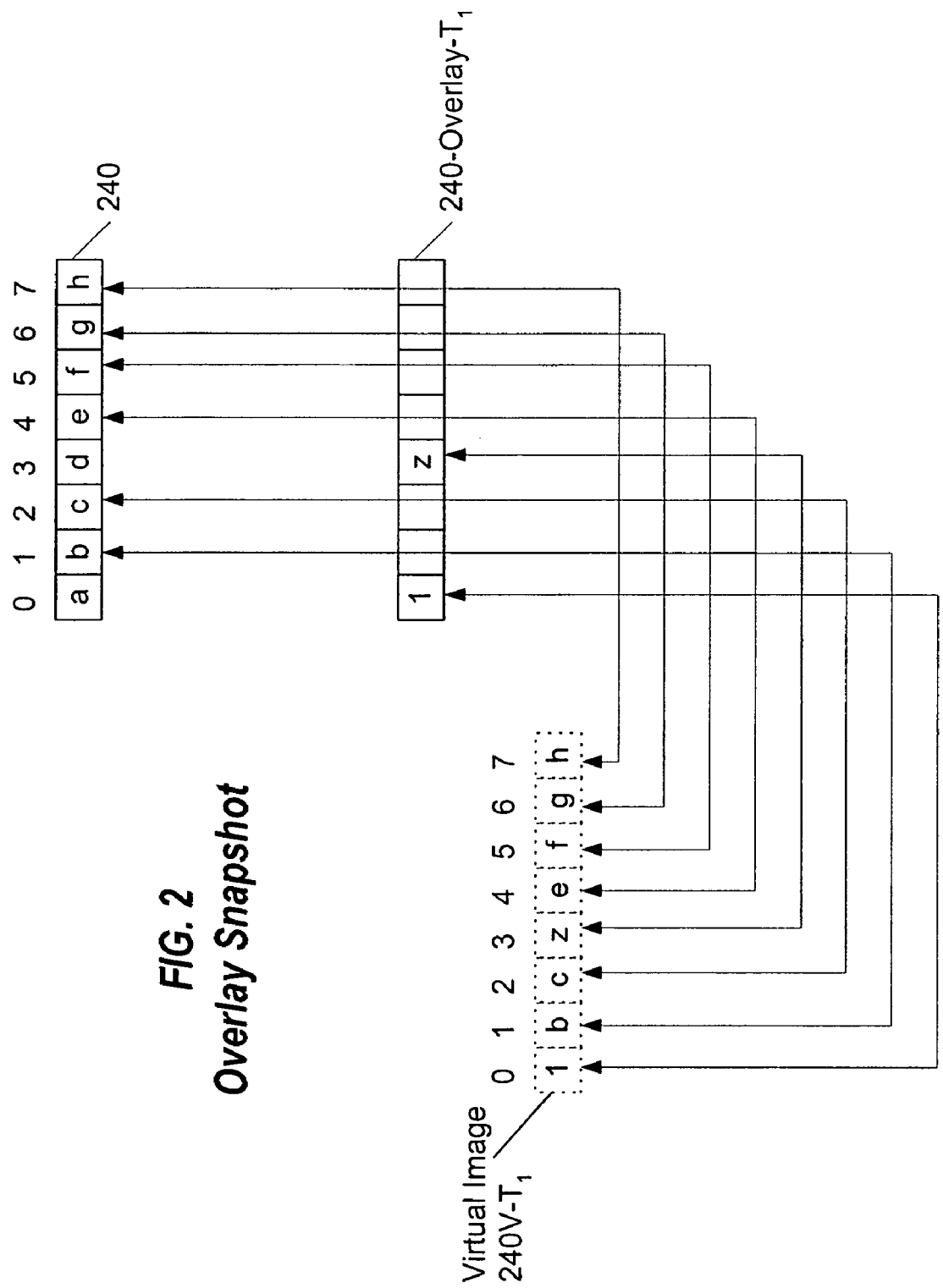
FIG. 2 shows an example of a traditional overlay snapshot including an overlay storage object and underlying data volume and construction of a virtual image of the data.

FIG. 2 shows an example of a traditional overlay snapshot including an overlay storage object and underlying data volume and construction of a virtual image of the data from the overlay snapshot. Data volume 240 is shown at time $T_0$, having eight regions, labeled regions 0 through 7, with each region containing a one-character data value, here 'a' through 'g.' An overlay storage object at time $T_0$ (not shown) is empty. One of skill in the art will recognize that a physical device may be organized into units other than regions and that a unit of storage, such as a region, will correspond to a set of data, such as a 512-byte block, rather than a single character.

After time $T_0$, data having a value of 'x' are written to region 0, data having a value of 'z' are written to region 3, and data having a value of '1' are written to region 0 (overwriting the previously-written value of 'x'). Overlay storage object 240-Overlay-$T_1$ shows a value of '1' in region 0 and a value of 'z' in region 3 at time $T_1$; data volume 240 has not changed. Virtual image 240V-$T_1$ shows values for the set of data as constructed from overlay storage object 240B-Overlay-$T_1$ regions 0 and 3 and base volume 240 regions 1, 2, and 4-7. Resulting virtual image 240V-$T_1$ has values '1', 'b', 'c', 'z', 'e', 'f', 'g', and 'h' in regions 0 through 7.

With overlay storage objects, write operations are relatively inexpensive, because no data must be copied to preserve a previous version of the data. However, metadata indicating the location of the data must be recorded. Often metadata indicating the locations of current data for each region are tracked in the form of a bitmap. In the bitmap, each bit represents one region of the data and the bit value indicates whether the current data for the region are in the main storage volume or in an overlay storage object. Such metadata may be stored in other forms, such as a table or list of locations for each region, although bitmaps enable easy manipulation of the location information.

Furthermore, with overlay storage objects, read operations must determine the locations from which to read current data. In some implementations, when a read operation is to take place, data are moved from the overlay storage object(s) to the main storage volume. This data transfer can be relatively expensive when large amounts of data must be transferred. However, if the new write operations are logged to a separate device dedicated to storing the overlay storage object, no conflicting operations will interfere with retrieval and transfer of the data from the overlay storage object.

Storage space for snapshots can be allocated in several ways. For example, when a snapshot is created, storage space can be allocated in the snapshot to store each block of the corresponding storage volume. This technique reserves space in advance so that I/O operations can proceed without the need to acquire storage space to store the result. However, for very large storage volumes, much of the pre-allocated space may be unused. Another technique is to dynamically allocate the space needed for each I/O operation to the snapshot, which requires additional overhead for I/O operations but more efficiently uses storage space. Such snapshots are known as "space-optimized" snapshots. These storage space allocation techniques are known in the art.

Space-optimized snapshots are sometimes referred to as "cache-structured" snapshots because the data are organized for efficient use of space. In storing data in a cache-structured snapshot, a cache manager stores the data in a layout that efficiently stores data rather than using a strict logical-to-physical address translation. A mapping is used to track correspondence between the logical region of the data to the physical region of the underlying physical storage device. Upon responding to a read request, the cache manager uses the mapping identify the physical region of the storage device from which to read data for a given logical address, rather than performing a simple address translation to obtain the physical address.

Another important consideration in managing backup versions of the primary data is that an increase in a number of devices increases the probability of failure of at least one of these devices. With copy-on-write snapshots, the probability of losing the current version of the data remains the same as the probability of losing the primary volume itself. However, the probability of losing at least one of the snapshots of previous versions of the data increases with the number of devices storing snapshots. With overlay storage objects, failure of any one device may cause the loss of integrity of the current version of the data; for example, with reference to FIG. 2, failure of the device storing overlay storage object 240-Overlay-$T_1$ will cause the current version of the data (shown in virtual image 240V-$T_1$) to be lost. This effect of lowered reliability can be ameliorated by mirroring the storage used for overlay storage objects.

In addition to taking multiple snapshots of one set of data at different points in time, snapshots of snapshots can be made. Furthermore, changes can be independently written to snapshots, creating a "hierarchy" of snapshots of the data, as described in U.S. patent application Ser. No. 10/610,603, client reference VRTS 0073), filed on Jul. 1, 2003, entitled "Flexible Hierarchy of Relationships and Operations in Data Volumes," and naming as inventors Anand A. Kekre, John A. Colgrove, Oleg Kiselev, Ronald S. Karr, and Niranjan S. Pendharkar, the application being incorporated by reference herein in its entirety and for all purposes. Snapshots to which changes can be independently written are referred to herein as "writeable snapshots." A snapshot made to preserve a version of the data as of a given point in time, and to which data are not later written, is referred to herein as a "point-in-time snapshot."

Figure 3A:
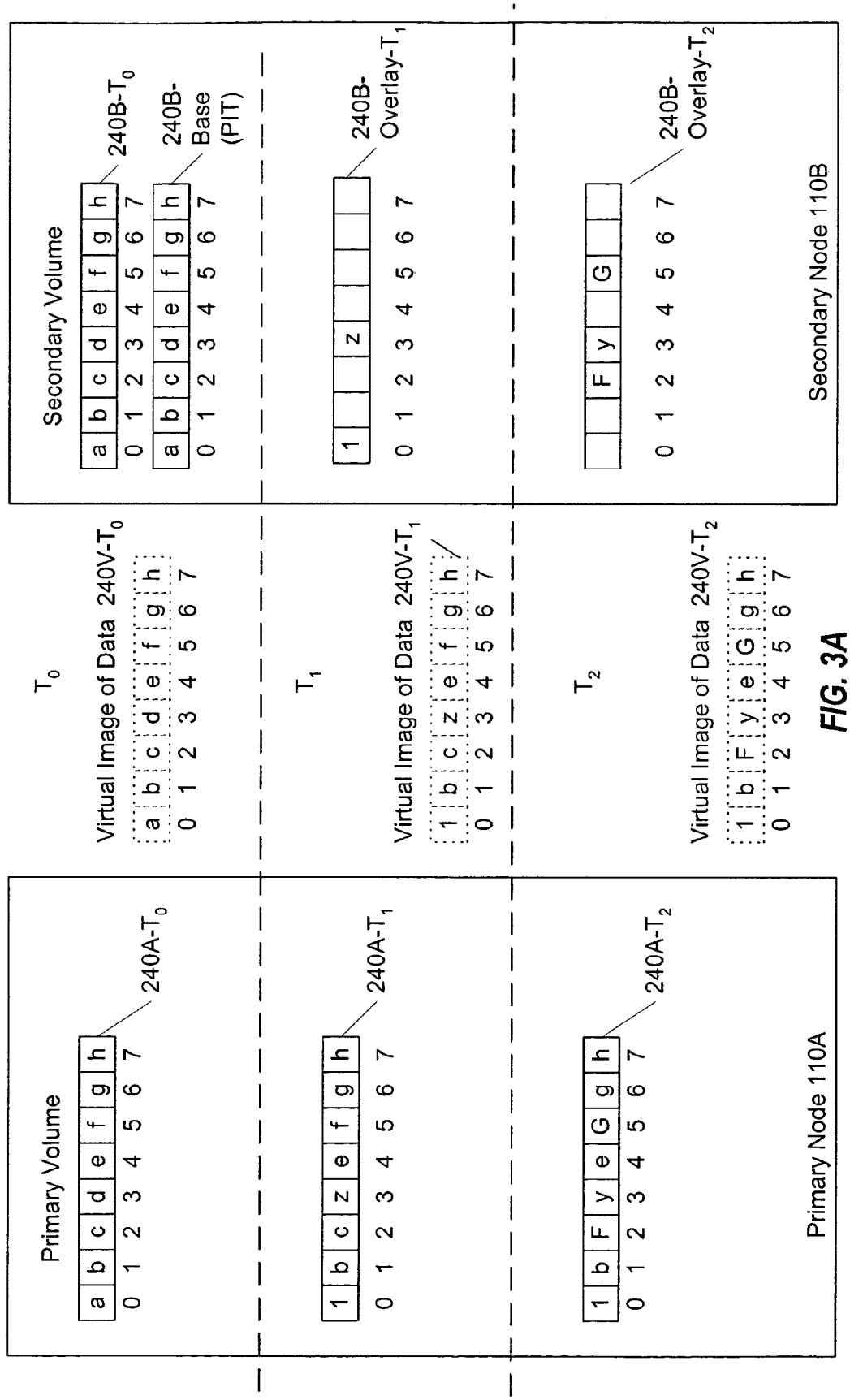
FIG. 3A shows an example of several instances of primary and secondary data at different points in time when maintained using traditional overlay snapshots.

FIG. 3A shows an example of several instances of primary and secondary data at different points in time when maintained using traditional overlay snapshots. Each of primary node 110A and secondary node 110B shows copies of a set of data at times $T_0$, $T_1$, and $T_2$. Data for secondary volume 240B at time $T_0$ is shown in the form of an empty overlay storage object 240-Overlay-$T_0$ and base volume 240B-Base(PIT), although one of skill in the art will recognize that other forms of storage may be used for secondary volumes, such as copy-on-write snapshots, full data snapshots, and so on. Primary volume 240A-$T_0$ and secondary volume 240B (as represented by virtual image 240V-$T_0$) are identical at time $T_0$, having values 'a' through 'g' in regions 0 through 7. Point-in-time snapshot volume 240B-Base(PIT) is made to preserve the state of the data at time $T_0$ and serves as the base volume for overlay storage objects at times $T_0$, $T_1$, and $T_2$.

Changes between time $T_0$ and $T_1$ are the same as those described with reference to FIG. 2. After time $T_0$, data having a value of 'x' are written to region 0, data having a value of 'z' are written to region 3, and data having a value of '1' are written to region 0 (overwriting the previously-written value of 'x'). Primary volume 240A-$T_1$ shows values '1', 'b', 'c', 'z', 'e', 'f', 'g', and 'h' in regions 0 through 7. Virtual image 240V-$T_1$ shows values for the set of data as constructed from overlay storage object 240B-Overlay-$T_1$ and base volume 240B-Base(PIT), also including values '1', 'b', 'c', 'z', 'e', 'f', 'g', and 'h' in regions 0 through 7. Construction of overlay storage object 240B-Overlay-$T_1$ was described with reference to FIG. 2. If primary volume 240A-$T_1$ were to fail at time $T_1$, read operations could be redirected to read from secondary node 110B by, for example, requesting data from secondary node 110B. While read operations would be less efficient, requiring reconstruction of virtual images such as virtual image 240V-$T_1$, operations could proceed until the underlying volume was available again.

After time $T_1$, data having a value of 'F' are written to region 2, data having a value of 'y' are written to region 3, and data having a value of 'G' are written to region 5. Primary volume 240A-$T_2$ shows values '1', 'b', 'F', 'y', 'e', 'G', 'g', and 'h' in regions 0 through 7. Virtual image 240V-$T_2$ shows values for the set of data as constructed from the layered set of snapshots including overlay storage object 240B-Overlay-$T_2$, overlay storage object 240B-Overlay-$T_1$, and base volume 240B-Base(PIT). Virtual image 240V-$T_2$ also includes values '1', 'b', 'F', 'y', 'e', 'G', 'g', and 'h' in regions 0 through 7. When multiple overlay storage objects are used, current data for a region of the data storage are read from the most recent overlay storage object that has data for that region. If none of the multiple overlay storage objects has data for a given region, that region's data are read from the underlying data volume, which serves as a point-in-time snapshot. Assume that a discovery is made that the write operations after time $T_1$ corrupted the primary data, and a decision is made to restore the primary data to the state that existed at time $T_1$.

FIG. 3B shows an example of the data produced when reconstructing primary data using the traditional overlay snapshots of FIG. 3A after discovery that a portion of the primary data is corrupted. Virtual image 240V-$T_3$ can be constructed from the hierarchy represented by overlay storage object 240B-Overlay-$T_1$ and base snapshot 240B-Base (PIT), as described with reference to FIG. 3A.

For efficiency purposes, however, it is desirable to reconstruct virtual image 240V-$T_3$ using data from primary volume 240A-$T_2$ if possible, since not all data on the primary volume were corrupted. Location map 310 can be constructed to identify the locations of valid data for each region at time $T_3$. Between times $T_1$ and $T_2$, data were written to regions 2, 3 and 5. This information can be obtained, for example, from a bitmap associated with overlay storage object 240B-Overlay-$T_2$ or from the log used to update either primary volume 240A-$T_2$ or secondary volume 240B-$T_2$. Changes made between times $T_1$ and $T_2$ are to be "backed out," which can be accomplished by using data for regions 2, 3 and 5 from the remote node 110B. Location map 310 can contain values of '0' for regions 2, 3, and 5, indicating that those data values are to be obtained from the remote node 110B. To read those values from remote data storage, a storage manager/replicator, such as storage manager/replicator 120A on primary node 110A of FIG. 1A, would request a corresponding storage manager/replicator 110B on secondary node 110B to provide those data values. Other values can be read from primary volume 240A-$T_2$, as indicated by the values of '1' for regions 0, 1, 4, 6, and 7 in location map 310.

Data for region 3 is valid in overlay storage object 240B-Overlay-$T_1$, and data for regions 2 and 5 have not changed since base snapshot 240B-Base(PIT) was made. These data for regions 2, 3, and 5 from the remote security domain 110B are then combined with the unchanged data from regions 0, 1, 4, 6, and 7 in primary volume 240A-$T_2$ to form virtual image 240V-$T_3$. Virtual image 240V-$T_3$ can then be used to restore the data in primary volume 240A.

In the example of FIG. 3B, point-in-time snapshots are created and managed on secondary node 110B. One management decision when maintaining point-in-time snapshots is whether to create them on the primary node, secondary node, or both. If point-in-time snapshots are created and managed on the primary node, recovery of a previous version of the data is faster because data need not be transferred across the network or replication link. However, point-in-time snapshots on the primary node are vulnerable to breaches of security in the primary node. In most cases, damaging some easily-identifiable index and map data stored on the disks is sufficient to render the snapshots unusable.

Furthermore, maintaining point-in-time snapshots diverts resources from maintaining the primary data itself. Creation of snapshots requires auxiliary I/O operations to update snapshot maps and/or metadata. Snapshots also increase the amount of data in primary data storage, which degrades the overall I/O performance of the primary node. Furthermore, presumably, snapshots will be replicated along with the primary data, increasing the amount of data traveling over the replication link.

Creating point-in-time snapshots on the remote node offloads some of the maintenance burden from the primary node, but accessing the point-in-time snapshots requires data movement from the remote to the primary node. One management solution may be to perform all read operations on the primary node and to dedicate remote node resources to maintaining backup copies and point-in-time snapshots. Other implementations may maintain point-in-time snapshots on both the primary and secondary nodes. Preferably, a sufficient number of point-in-time snapshots is made to enable the ability to recover the primary data as it existed at several recent points in time.

Figure 3C:
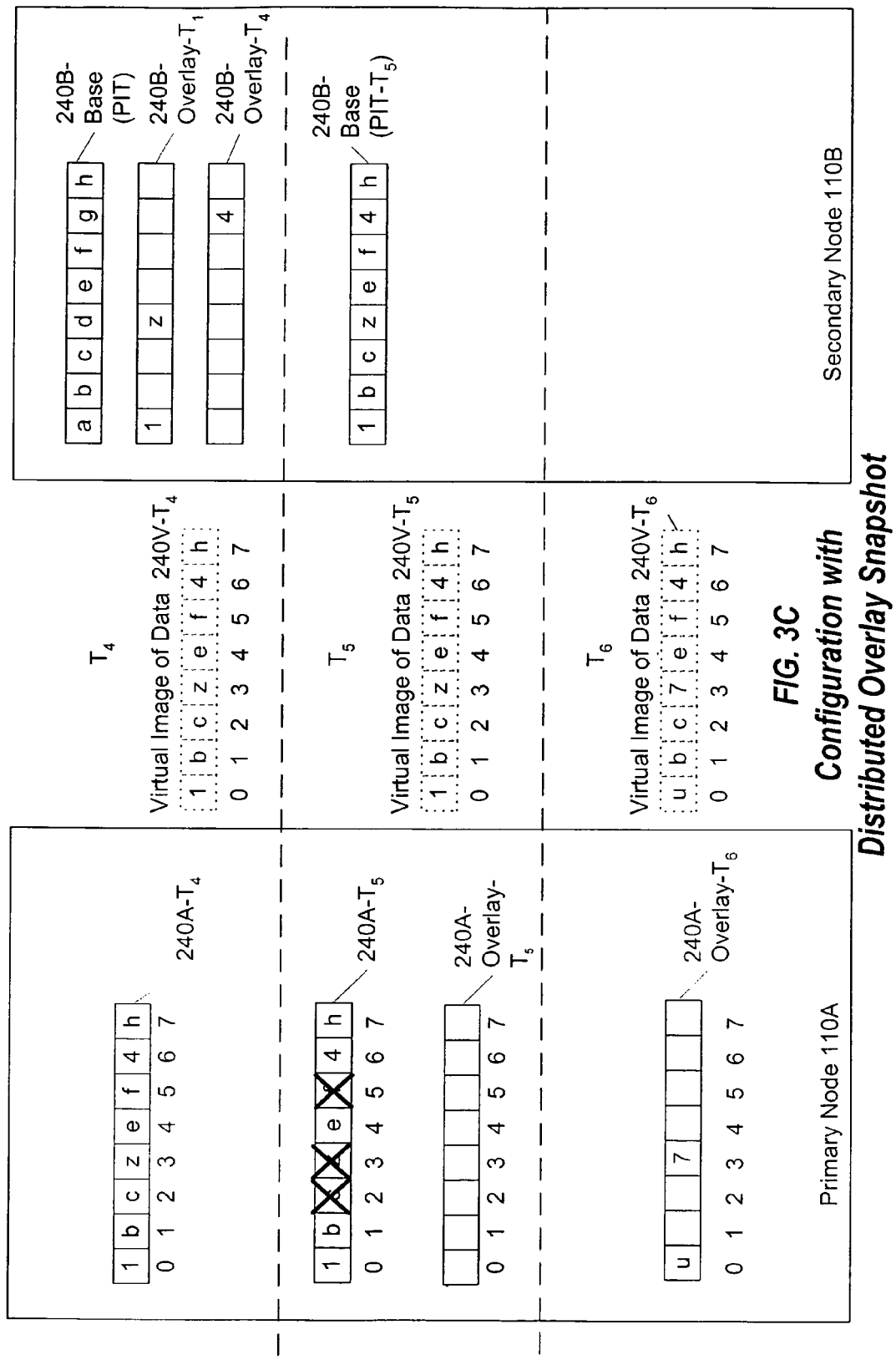
FIG. 3C shows a technique for maintaining primary data using a distributed overlay snapshot after discovery that a portion of the primary data is corrupted.

FIG. 3C shows a technique for maintaining primary data using a distributed overlay snapshot after discovery that a portion of the primary data is corrupted. The initial state of the primary volume 240A-$T_4$ is shown at time $T_4$. Region 6 of primary volume 240A has been updated to include a value of '4,' replacing the value of 'g' shown at time $T_3$, as shown in FIG. 3B. In FIG. 3C, virtual image 240V-$T_4$, constructed from data on secondary node 110B, contains identical data to primary volume 240A-$T_4$ at time $T_4$. This data from secondary node 110B includes data from secondary volume 240B-Base (PIT) unchanged since time $T_1$, having values 'a' through 'h' in regions 0 through 7. Two overlay objects are shown on secondary node 110B, overlay snapshot 240B-Overlay-$T_1$, containing values of '1' and 'z' for respective regions 0 and 3 and 240B-Overlay-T$_4$, including a value of '4' for region 6. Data on primary node 110A and secondary node 110B are synchronized at time T$_4$, with each reflecting the same values for each region.

At time T$_5$, a discovery is made that regions 2, 3, and 5 are unavailable for reading from primary volume 240A-T$_5$, as indicated by the X marks through regions 2, 3, and 5. Regions can become unavailable for reading when data stored in the region of the storage are corrupted, when a physical device providing underlying storage for the region fails, when a connection between the primary node and the underlying storage devices fails, or for other reasons. A strategy is used to allow operations to continue without writing to primary volume 240A-T$_5$ until valid values for regions 2, 3, and 5 can be determined and restored. This strategy includes creation of empty overlay snapshot 240A-Overlay-T$_5$ on primary node 110A at time T$_5$ upon making the discovery that regions 2, 3, and 5 are unavailable for reading. In addition, a snapshot 240B-Base(PIT-T$_5$) is made of secondary data storage on secondary node 110B by logically and/or physically combining data from snapshot 240B-Base(PIT) with data from overlay objects 240B-Overlay-T$_1$ and 240B-Overlay-T$_4$. It is not required that snapshot snapshot 240B-Base(PIT-T$_5$) be stored on a physical storage device and that the combined snapshots and overlay objects be eliminated, as long as the point-in-time image can be reconstructed as a virtual image of the data as it appeared at time T$_5$.

Write operations can continue to the primary data, although updates are written to overlay snapshot 240A-Overlay-T$_5$ rather than to primary volume 240A-T$_5$ to preserve the state of primary volume 240A until valid values for regions 2, 3, and 5 can be determined. Volume 240A-T$_5$ therefore remains unchanged after the discovery of the inability to read regions 2, 3, and 5 at time T$_5$. Write operations replacing the contents of region 0 with a value of 'u' and the contents of region 3 with a value of '7' are made after time T$_5$ and before time T$_6$. At time T$_6$, overlay snapshot 240A-Overlay-T$_6$ contains a value of 'u' for region 0 and a value of '7' for region 3. Virtual image 240V-T$_6$ contains values of 'u' for region 0 and '7' for region 3 from overlay snapshot 240A-Overlay-T$_6$ and the remaining values from 240B-Base(PIT-T$_5$). Although not shown in FIG. 3C, data from overlay snapshot 240A-Overlay-T$_6$ can be replicated to a corresponding overlay snapshot on secondary node 110B, which will include the same data as shown for 240A-Overlay-T$_6$. Replicating the overlay snapshot ensures that all of the data can be read from secondary node 110B in the event of complete failure of primary node 110A. In addition, portions of the data can be read from each of primary node 110A and secondary node 110B. Overlay snapshots on secondary node 110B are not shown after time T$_5$ to more clearly illustrate the construction of virtual image 240V-T$_6$ from data on both primary and secondary nodes 110A and 110B. The construction of virtual image 240V-T$_6$ is described further with reference to FIG. 3D.

FIG. 3D shows a technique for reading data using the distributed overlay snapshot of FIG. 3C. Secondary volume 240B-Base (PIT-T$_5$) is unchanged since time T$_5$, having values '1,' 'b,' 'c,' 'z,' 'e,' 'f,' '4,' and 'h' in regions 0 through 7. Volume 240A-T$_5$ is unchanged after the discovery of the inability to read regions 2, 3, and 5 at time T$_5$. At time T$_6$, overlay snapshot 240A-Overlay contains a value of 'u' for region 0 and a value of '7' for region 3. Location map 310 indicates that regions 2 and 5 are to be read from secondary (remote) node 110B, and regions 0, 1, 3, 4, 6, and 7 are to be read from primary (local) node 110A. Even though data for region 3 are unavailable from the base primary storage 240A-T$_5$, data for region 3 have been overwritten since the corruption was discovered at time T$_5$ and current data for region 3 can be obtained from the primary overlay snapshot 240A-Overlay-T$_6$. Thus, location map 310 shows a '1' for region 3, indicating that the data for region 3 will be read from primary node 110A.

Primary node-specific location map 312 indicates the location on primary node 110A from which data are to be read. Data for regions 0 and 3 are to be read from 240A-Overlay-T$_6$ because those regions have been updated since discovery of the corruption at time T$_5$, as shown by the values of 'PO,' indicating primary overlay, in the primary node-specific location map 312. Available data for regions 1, 4, 6 and 7 are to be read from primary volume 240A-T$_5$ since those regions are not designated as unavailable, as shown by the values of 'PB,' indicating primary base volume 240A-T$_5$, in the primary node-specific location map 312. Regions 2 and 5 are to be read from secondary node 110B, and thus have values of 'R' in primary node-specific location map 312, indicating that regions 2 and 5 are to be read from remote secondary node 110B.

Reading data from secondary snapshot 240B-Base (PIT-T$_5$) ensures that a stable copy of the data, made at a time when the data on secondary node 110B were synchronized with the data on primary node 110A, is used to recover values for unavailable regions 2 and 5. Reading data that have changed since time T$_5$ from overlay snapshot 240A-Overlay-T$_6$ ensures that the most current updates to primary data are reflected, including data for region 3 that are not available from primary base data storage 240A-T$_5$. Reading available data from regions 1, 4, 6 and 7 from primary volume 240A-T$_5$ saves network bandwidth and accelerates the construction of a virtual image using only unavailable data from secondary node 110B. The resulting virtual image 240V-T$_6$ has values 'u,' 'b,' 'c,' '7,' 'e,' 'f,' '4,' and 'h' in regions 0 through 7.

Figure 3E:
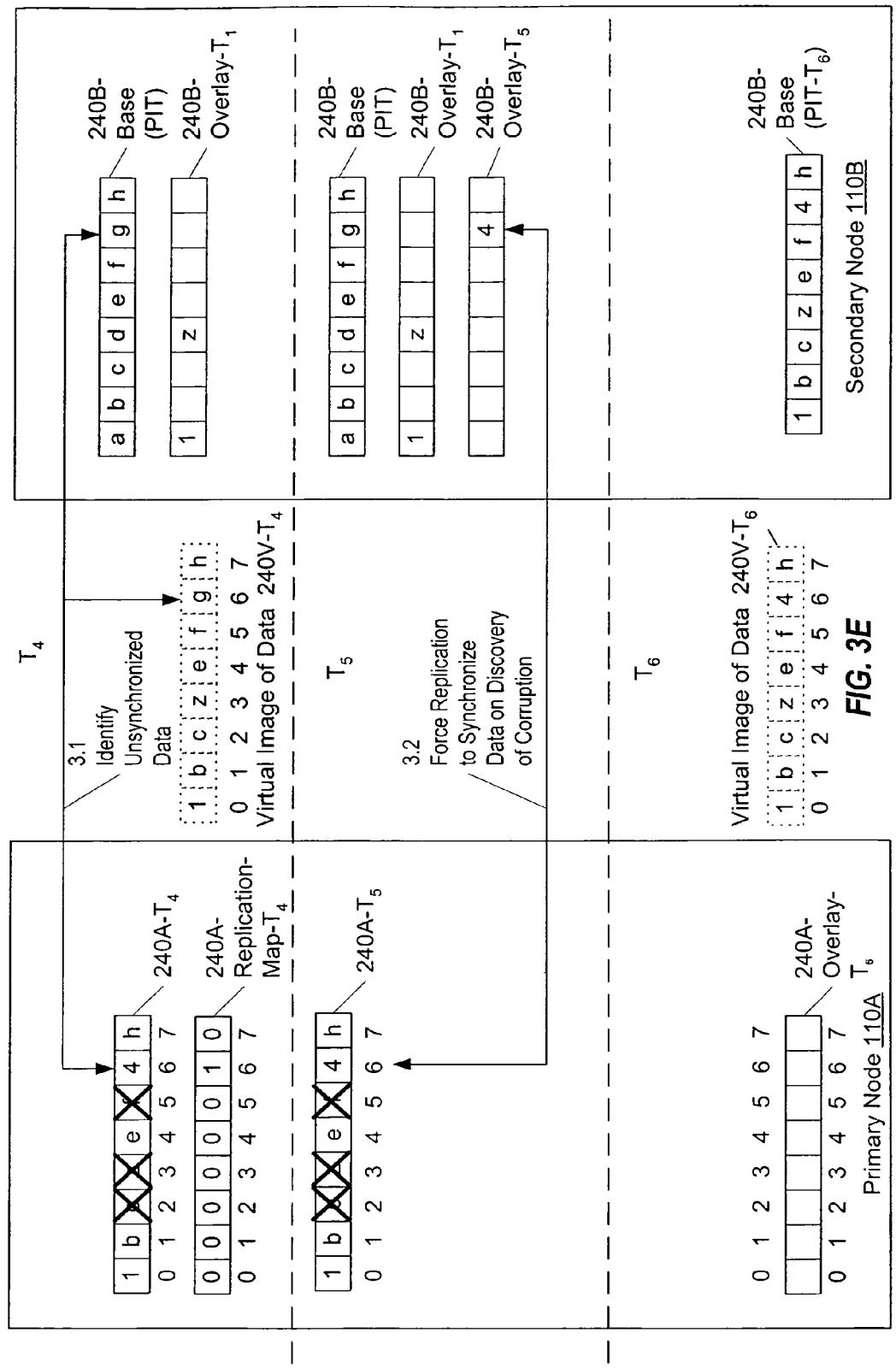
FIG. 3E shows a technique for maintaining primary data using a distributed overlay snapshot after discovery that a portion of the primary data is corrupted and when data on the secondary node are unsynchronized with data on the primary node.

FIG. 3E shows a technique for maintaining primary data using a distributed overlay snapshot after discovery that a portion of the primary data is corrupted and when data on the secondary node are unsynchronized with data on the primary node. At time T$_4$, regions 2, 3, and 5 are determined to be corrupted and data on primary node 110A and secondary node 110B are identified as being unsynchronized, as shown by action 3.1. Replication map 240A-Replication-Map-T$_4$ shows that region 6 of primary volume 240A-T$_4$, having a value of '1,' has not yet been replicated from primary node 110A to secondary node 110B. As a result, the value of region 6 on primary node 110A is '4,' and the value of region 6 on secondary node 110B is still 'g,' having not yet been replaced with a value of '4.'

In action 3.2, replication of data from region 6 is forced from primary node 110A to secondary node 110B so that all available data from primary node 240A-T$_5$ are synchronized with corresponding data on secondary node 110B. The forced replication creates overlay snapshot 240B-Overlay-T$_5$, having a value of '4' in region 6. At time T$_6$, point-in-time snapshot 240B-Base(PIT-T$_6$) is made on secondary node 110B by logically and/or physically combining data from snapshot 240B-Base(PIT) with overlay objects 240B-Overlay-T$_1$ and 240B-Overlay-T$_5$. Point-in-time snapshot 240B-Base(PIT-T$_6$) reflects the same values as primary volume 240A-T$_4$ had before the corruption. Virtual image 240V-T$_6$ accurately represents the state of the data, and writes to overlay snapshot 240A-Overlay-T$_6$ can begin from a synchronized state.

Figure 3G:
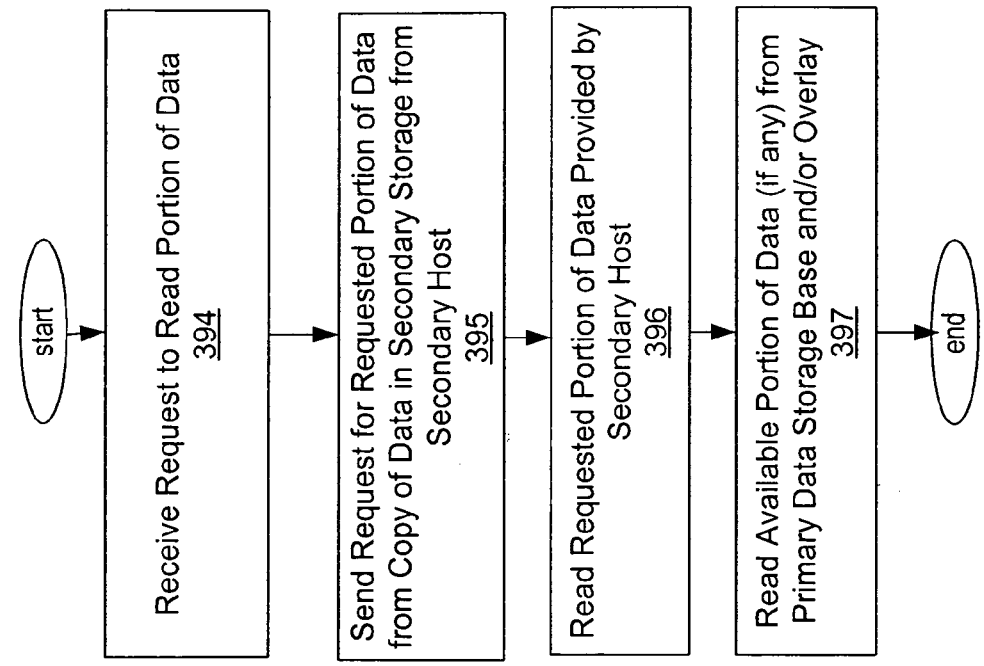
FIG. 3G shows a flowchart for reading data using a distributed overlay snapshot such as those shown in FIGS. 3C through 3E.
Figure 3F:
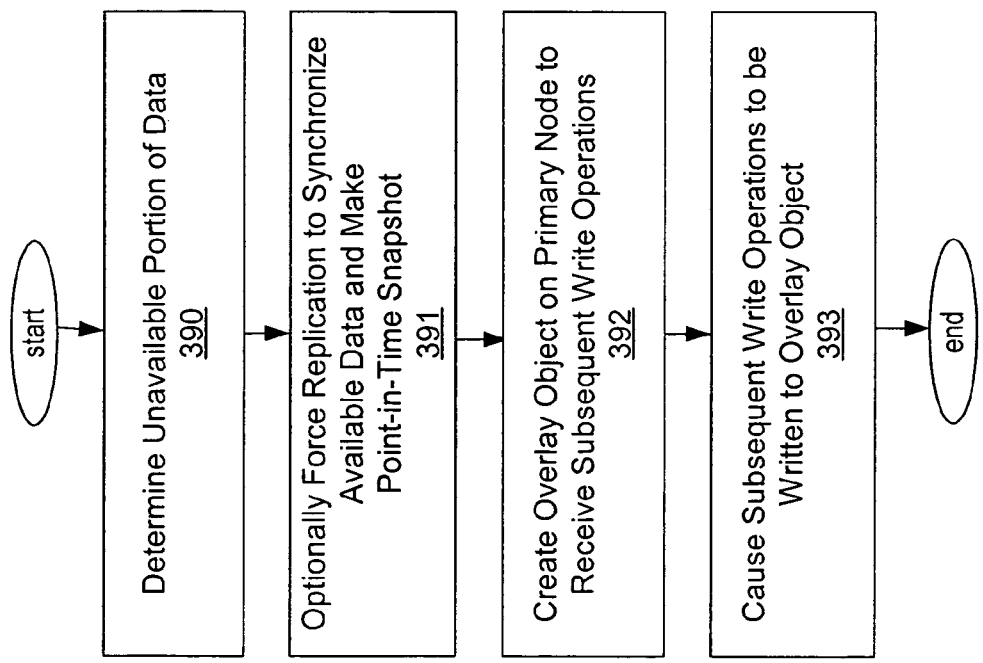
FIG. 3F shows a flowchart for setting up a distributed overlay snapshot such as those shown in FIGS. 3C through 3E.

FIG. 3F shows a flowchart for setting up a distributed overlay snapshot such as those shown in FIGS. 3C through 3E. In "Determine Portion of Data Unavailable for Reading" step 390, a determination is made that portions of a set of data are unavailable for reading. As mentioned earlier, regions of data can become unavailable for reading when data stored in the region of the storage are corrupted, when a physical device providing underlying storage for the region fails, when a connection between the primary node and an underlying storage device fails, or for other reasons.

From "Determine Portion of Data Unavailable for Reading" step 390, control proceeds to "Optionally Force Replication to Synchronize Available Data and Make Point-in-Time Snapshot" step 391. In "Optionally Force Replication to Synchronize Available Data and Make Point-in-Time Snapshot" step 391, if data on the primary node and secondary node are not synchronized due to a lag in replication, replication of the available data that are unsynchronized can be performed. In the example given in FIG. 3E, the unsynchronized data were identified using replication map 240A-Replication-Map-$T_4$, which identifies each region to which changes have been made that is designated for replication but not yet replicated. After the replication of the available data, a point-in-time snapshot of the secondary data is made, as described with reference to point-in-time snapshot 240B-Base(PIT-$T_5$) of FIG. 3C and 240B-Base(PIT($T_6$)) of FIG. 3E. Creation of a point-in-time snapshot from data on the secondary node after replication of unsynchronized available data enables a distributed overlay snapshot to be created with data that are synchronized.

From "Optionally Force Replication to Synchronize Available Data and Make Point-in-Time Snapshot" step 391, control proceeds to "Create Overlay Object on Primary Node to Receive Subsequent Write Operations" step 392. An overlay object or other writeable area for writing updates to the primary data is created to receive the results of subsequent write operations, enabling the primary node to proceed with operations until the source of the unavailability of the data can be determined. Examples of such overlay objects are overlay object 240B-Overlay-$T_1$ and overlay object 240B-Overlay-$T_4$ of FIG. 3C. From "Create Overlay Object on Primary Node to Receive Subsequent Write Operations" step 392, control proceeds to "Cause Subsequent Write Operations to be Written to Overlay Object" step 393. In "Cause Subsequent Write Operations to be Written to Overlay Object" step 393, each write operation to primary data storage is redirected to an overlay object rather than written to the primary data itself.

FIG. 3G shows a flowchart for reading data using a distributed overlay snapshot such as those shown in FIGS. 3C through 3E. In "Receive Request to Read Portion of Data" step 394, a request to read a portion of data from the primary data storage is received. For example, such a request may be received from application 115A of FIG. 1. Control then proceeds to "Send Request for Requested Portion of Data from Copy of Data in Secondary Storage from Secondary Host" step 394. As noted above, a point-in-time snapshot of a previous version of the data is maintained on a secondary node, such as point-in-time snapshot 240B-PIT-$T_5$ of FIG. 3 and can be used as a data source for read operations.

In "Request Corresponding Portion of Data from Copy of Data in Secondary Storage from Secondary Host" step 394, the primary node requests a corresponding portion (corresponding to the unavailable portion of the data on the primary node) from a copy of the data in secondary storage from the secondary node. Preferably, the secondary node will provide the corresponding portion of the data from the most recent point-in-time snapshot made on the secondary node. If the available, unsynchronized data were replicated in "Optionally Force Replication to Synchronize Available Data and Make Point-in-Time Snapshot" step 392, the most recent point-in-time snapshot will be synchronized with the primary data. The entire portion of the data requested may be included in the request sent to the secondary node, or a determination may first be made whether any of the data in the portion requested is available on the primary data storage. If a sub-portion of the data are available on the primary data storage, that sub-portion of the data may be read from the first data storage and only the remaining data may be requested from the secondary node. The request for data from the secondary host may also be optimized before it is made; if only a small amount of data are available from the primary data storage, it may be more efficient to request all of the portion from the secondary data storage.

The requested portion of the data is provided by the secondary node. Control then proceeds to "Read Requested Portion of Data Provided by Secondary Host" step 396. In "Read Requested Portion of Data Provided by Secondary Host" step 396, the primary node reads the requested portion of the data provided by the secondary node. If the requested portion of the data does not include all regions of portion of the data requested from the primary node, available data are read from the primary node in "Read Available Portion of Data (if any) from Primary Data Storage Base and/or Overlay" step 397. Available data can be read from primary base data storage. If data have been updated since creation of an overlay snapshot, that data is read from the overlay snapshots to which changes to primary data have been written since the unavailability of the data was discovered.

Each of the steps of the flowcharts of FIGS. 3F and 3G can be performed by the storage manager/replicator 120A of primary node 110A of FIG. 1. As such, storage manager/replicator 120A can be considered to be a receiving module, means, and/or instructions to receive a request to read a portion of data from first data storage. Storage manager/replicator 120A can also be considered to be a requesting module, means, and/or instructions to request a requested portion of a copy of the data in the second data storage from a second host that can access the second data storage. Storage manager/replicator 120A can also be considered to be a receiving module, means, and/or instructions to receive the requested portion from the second host. Storage manager/replicator 120A can also be considered to be a reading module, means, and/or instructions to read the portion of the data by reading the requested portion received from the second host and, if a sub-portion of the portion of the data was not requested and is available from the first data storage, reading the sub-portion of the data from the first data storage.

Storage manager/replicator 120A can also be considered to be a requesting module, means, and/or instructions to determine that a second portion of data stored in primary data storage is unavailable for reading. Data can be unavailable when the data are corrupted or due to a storage device failure or communication failure. Storage manager/replicator 120A can also be considered to be a creating module, means, and/or instructions to create a third data storage upon determining that the second portion of the data is unavailable. Storage manager/replicator 120A can also be considered to be a causing module, means, and/or instructions to cause each subsequent change to the data in the first data storage to be written to the third data storage.

Storage manager/replicator 120A can also be considered to be a changed-region-identifying module, means, and/or instructions to identify a set of changed regions of the first data storage using a set of indicators, wherein each indicator of the set indicates whether at least one change was made to data in a respective region of the first data storage. Storage manager/replicator 120A can also be considered to be an adding module, means, and/or instructions to add each region of the set of changed regions to the corresponding portion requested from the secondary host. Storage manager/replicator 120A can also be considered to be a synchronization-determining module, means, and/or instructions to determine whether the first data storage is synchronized with the second data storage. If the second data storage is not synchronized with the first data storage, storage manager/replicator 120A can also be considered to be an unsynchronized-region-identifying module, means, and/or instructions to identify a set of unsynchronized regions of the first data storage, wherein each region in the set of unsynchronized regions is unsynchronized with a corresponding region of the second data storage. When regions are unsynchronized, storage manager/replicator 120A can also be considered to be a forcing module, means, and/or instructions to force replication of the set of unsynchronized regions prior to requesting the corresponding portion.

Storage manager/replicator 120A can also be considered to be a lag-determining module, means, and/or instructions to determine whether a lag in replication from the first data storage to the second data storage exists. If the lag exists, the first data storage and the second data storage are not synchronized. Determining whether the lag in replication from the first data storage to the second data storage exists involves examining a replication map for the first data storage, such that storage manager/replicator 120A can also be considered to be an examining module, means, and/or instructions. A lag is determined to exist if at least one respective region in the replication map has an indicator that the region has changed but has not yet been replicated to secondary data storage.

Figure 3H:
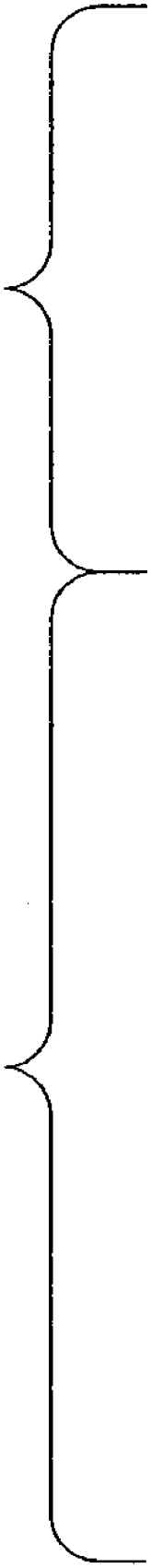
FIG. 3H shows a technique for determining a location in the distributed overlay snapshot from which to read data for a region using a valid/modified table for regions of primary data storage.

FIG. 3H shows a technique for determining a location in the distributed overlay snapshot from which to read data for a region using a valid/modified table for regions of primary data storage. Construction of valid/modified tables is described in further detail in co-pending U.S. patent application Ser. No. 10/143,059, entitled "Method and Apparatus for Creating a Virtual Data Copy," filed May 10, 2002, and naming as inventors Anand A. Kekre, John A. Colgrove, Oleg Kiselev, Ronald S. Karr, and Niranjan S. Pendharkar (incorporated by reference above). Valid/Modified table 340A is used to determine a location from which to read data from the secondary node for a given region when the data in the region containing the primary data is in different states. The determined read location is shown in Read Location column 350 of FIG. 3H. If a region contains invalid primary data (indicating that no valid copy for a given region exists in either primary base data storage or in a primary overlay object), that region of the data is read from the most recent remote point-in-time snapshot. If that region contains primary data that are valid, and the data for that region have not been modified, that region of the data is read from the primary base data storage. If that region contains primary data that are valid, and the data for that region have been modified, that region of the data is read from the most recent primary overlay object having data for that region.

The present invention can be implemented in many types of storage environments. An environment that provides secure secondary data can be used to implement one embodiment of the invention, as described in the next section.

Embodiment with Separate Security Domains

In one embodiment, separate security domains can be established for the primary and secondary nodes so that a user or process performing an operation on the primary data storage must pass through an additional security barrier to perform the same operation on the secondary data storage. Changes to primary data can be synchronously replicated over a tightly controlled replication link from the primary data storage to the secondary data storage in the other security domain. If the primary data are compromised by a malicious intruder, administrator mistake, or malfunctioning software or hardware, only locally accessible storage is directly jeopardized. To also corrupt the backup data, the additional security barrier must be overcome and the destructive actions corrupting the data must be repeated.

A technique for maintaining primary data and secondary data using synchronous replication between separate security domains is described in U.S. patent application Ser. No. 10/699,475, filed on Oct. 31, 2003, entitled "Synchronous Replication for System and Data Security," and naming as inventor Oleg Kiselev, the application being incorporated by reference herein in its entirety and for all purposes.

Failure Scenarios

Upon failure of the primary node, the application managing the primary data can resume operation on the secondary node. The rapid recovery provided by maintaining a secure, up-to-date, and consistent version of the primary data enables operations to be restored as soon as the primary node can be made available.

When data are recovered from a previous version of the data, the system can be configured to perform iterative recovery attempts. For example, different images of the data can be restored from snapshots representing various points in time and tested for acceptability without overwriting the primary data. The history of corruption can be investigated directly, write by write, and a "best" version of the data can be selected for restoration of the primary storage volume.

For example, with reference to FIG. 3C, assume that virtual image 240V-T$_6$ is determined to contain invalid data for at least one region. The write operations in overlay snapshot 240A-Overlay-T$_6$ can be "backed out" and primary data can be reconstructed using point-in-time snapshots and overlay snapshots made at a previous point in time. Testing can be performed on multiple virtual images simultaneously, until the most recent virtual image can be identified with valid data. When the valid virtual image is determined, primary data storage can be restored from that valid virtual image, and subsequent write operations can be made to the primary data storage itself, discontinuing the use of overlay snapshots on the primary node. This restoration and testing can proceed without halting operations or affecting availability of the data.

The above-described embodiments of the invention can be implemented in a variety of computing and networking environments. An example computing environment that can be used to implement the invention is described below with reference to FIG. 4.

An Example Computer System

Figure 4:
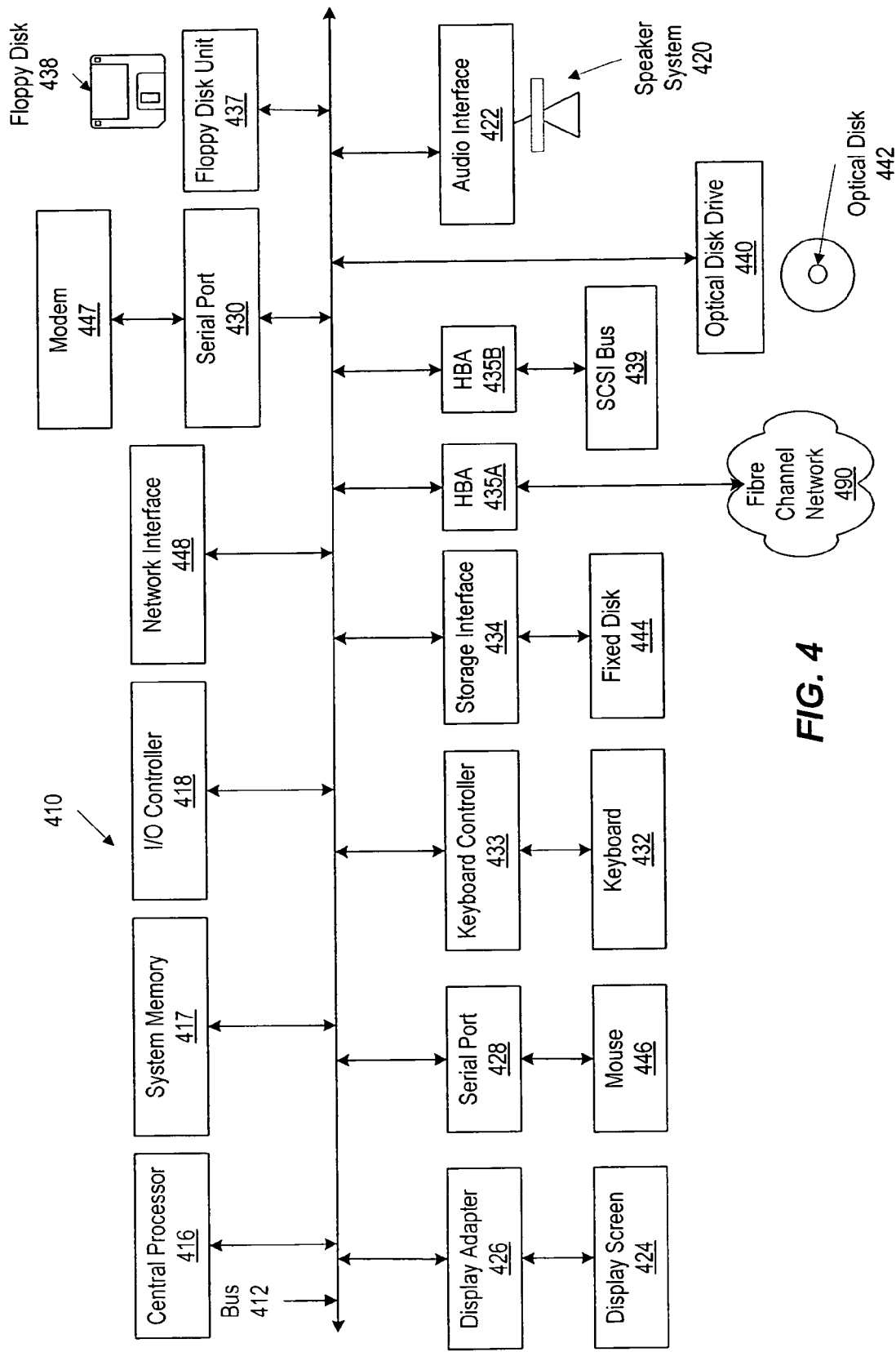
FIG. 4 is an example configuration of a computer system that can be used to operate the present invention.

FIG. 4 depicts a block diagram of a computer system 410 suitable for implementing the present invention. Computer system 410 includes a bus 412 which interconnects major subsystems of computer system 410, such as a central processor 414, a system memory 417 (typically RAM, but which may also include ROM, flash RAM, or the like), an input/output controller 418, an external audio device, such as a speaker system 420 via an audio output interface 422, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a fibre channel network 490, a host bus adapter (HBA) interface card 435B operative to connect to a SCSI bus 439, and an optical disk drive 440 operative to receive an optical disk 442. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), floppy disk unit 437 or other storage medium. Additionally, applications may be in the form of electronic signals modulated in accordance with the application and data communication technology when accessed via network modem 447 or interface 448.

Storage interface 434, as with the other storage interfaces of computer system 410, may connect to a standard computer readable medium for storage and/or retrieval of information, such as a fixed disk drive 444. Fixed disk drive 444 may be a part of computer system 410 or may be separate and accessed through other interface systems. Modem 447 may provide a direct connection to a remote server via a telephone link or to the Internet via an internet service provider (ISP). Network interface 448 may provide a direct connection to a remote server via a direct network link to the Internet via a POP (point of presence). Network interface 448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 4 to be present to practice the present invention. The devices and subsystems may be interconnected in different ways from that shown in FIG. 4. The operation of a computer system such as that shown in FIG. 4 is readily known in the art and is not discussed in detail in this application. Code to implement the present invention may be stored in computer-readable storage media such as one or more of system memory 417, fixed disk 444, optical disk 442, or floppy disk 438. Additionally, computer system 410 may be any kind of computing device, and so includes personal data assistants (PDAs), network appliances, X-window terminals or other such computing devices. The operating system provided on computer system 410 may be MS-DOS®, MS-WINDOWS®, OS/2®, UNIX®, Linux®, or another known operating system. Computer system 410 also supports a number of Internet access tools, including, for example, an HTTP-compliant web browser having a JavaScript interpreter, such as Netscape Navigator®, Microsoft Explorer®, and the like.

Advantages of the present invention are many. The invention can be used to ensure that backup copies of data are consistent, continuously available, and protected from corruption. Quick resumption of operations upon discovery of corruption of the primary data or failure of the primary node is possible using up-to-date, consistent backup copies of the data. Point-in-time snapshots are maintained on a secondary or remote node, and primary data is maintained on a primary node. When a portion of the data on the primary node becomes unavailable for reading due to corruption, device failure, or communication failure, a corresponding portion of the unavailable data is read from the secondary node. Portions of the data on the primary node that are available are read from the primary data storage to minimize the communication of data across a network. Data that has been updated since discovery of the unavailability of data can be read from overlay objects or other data structures to which data updates have been made. A complete image of the data in the distributed overlay snapshot may not be stored as a whole on either the primary secondary node, but rather can be constructed as a virtual image of the data from portions of the data stored on both nodes.

Reading different portions of the data from two different nodes enables operations to continue and data to remain available despite the unavailability of the data on the primary node. Furthermore, multiple virtual images of the data can be constructed using different point-in-time snapshots and overlay objects to test various recovery scenarios before restoring the primary data storage.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   receiving a request to read a portion of data from first data storage, wherein the request is received by a receiving module of a first host, the first host can access the first data storage, and the first host cannot access second data storage;
   requesting a requested portion of a copy of the data in the second data storage from a second host that can access the second data storage;
   receiving the requested portion from the second host; and
   reading the portion of the data by
      reading the requested portion received from the second host, and
      when a sub-portion of the portion of the data is not included in the requested portion received from the second host, reading the sub-portion from the first data storage.

2. The method of claim 1 further comprising:
   determining that a second portion of the data in the first data storage is unavailable;
   creating a third data storage upon performing the determining, wherein
   the first host can access the third data storage; and
   causing each subsequent change to the data in the first data storage to be written to the third data storage.

3. The method of claim 2 wherein
   when the portion of the data comprises an updated portion in the third data storage, the reading the portion of the data comprises reading the updated portion from the third data storage.

4. The method of claim 2 wherein
   the second portion of the data is unavailable because the second portion of the data is corrupted.

5. The method of claim 2 wherein
   the second portion of the data is unavailable because a device of the first data storage is unavailable.

6. The method of claim 2 further comprising:
   replicating data in the third data storage to fourth data storage accessible by the second host, wherein the fourth data storage cannot be accessed by the first host.

7. The method of claim 1 wherein
   the copy of the data in the second data storage was copied from a previous version of the data in the first data storage at a previous point in time.

8. The method of claim 1 wherein
   the data in the second data storage is a log of changes made to data in the first data storage after a previous point in time; and
   the requested portion is a set of changes in the log of changes, wherein
      each change in the set of changes comprises a change to the portion of the data, wherein the change was made after the previous point in time.

9. The method of claim 1 wherein the requesting the requested portion comprises:
   identifying a set of changed regions of a first plurality of regions of the first data storage using a set of indicators, wherein
      each indicator of the set indicates whether at least one change was made to data in a respective region of the first data storage, and;
   adding each region of the set of changed regions to the requested portion.

10. The method of claim 9 further comprising:
    determining whether the data in each region of the first plurality of regions of the first data storage is synchronized with the copy of the data in a corresponding region of a second plurality of regions of the second data storage; and
    when the data in one region of the first plurality of regions is not synchronized with the copy of the data in the corresponding region of the second plurality of regions,
       identifying a set of unsynchronized regions of the first data storage, wherein each region in the set of unsynchronized regions is unsynchronized with a corresponding region of the second data storage, and
       forcing replication of the data in the set of unsynchronized regions to the copy of the data in the second data storage prior to requesting the requested portion.

11. The method of claim 10 wherein the determining whether the data in each region of the first data storage is synchronized with the copy of the data in the corresponding region of the second data storage comprises
    determining whether a lag in replication from the first data storage to the second data storage exists, and
    when the lag exists, determining that the first data storage and the second data storage are unsynchronized.

12. The method of claim 11 wherein the determining whether the lag in replication from the first data storage to the second data storage exists comprises:
    examining a replication map for the first data storage, wherein the replication map comprises an indicator for each region of the first plurality of regions, the indicator for each region indicates whether data in a respective region of the first data storage have changed but have not yet been replicated; and
    when at least one respective region of the first plurality of regions has the indicator, determining that the lag exists.

13. A system comprising:
    first receiving means of a first host for receiving a request to read a portion of data from first data storage, wherein the first host can access the first data storage, and the first host cannot access second data storage;
    requesting means for requesting a requested portion of a copy of the data in the second data storage from a second host that can access the second data storage;
    second receiving means for receiving the requested portion from the second host; and
    reading means for reading the portion of the data by
       reading the requested portion received from the second host, and
       when a sub-portion of the portion of the data is not included in the requested portion received from the second host, reading the sub-portion from the first data storage.

14. The system of claim 13 further comprising:
determining means for determining that a second portion of the data in the first data storage is unavailable;
creating means for creating a third data storage upon performing the determining, wherein the first host can access the third data storage; and
causing means for causing each subsequent change to the data in the first data storage to be written to the third data storage.

15. The system of claim 14 further comprising:
second reading means for reading an updated portion from the third data storage if the portion of the data comprises the updated portion.

16. A system comprising:
a first receiving module of a first host to receive a request to read a portion of data from first data storage, wherein the first host can access the first data storage, and the first host cannot access second data storage;
a requesting module to request a requested portion of a copy of the data in the second data storage from a second host that can access the second data storage;
a second receiving module to receive the requested portion from the second host; and
a reading module to read the portion of the data by
reading the requested portion received from the second host, and
when a sub-portion of the portion of the data is not included in the requested portion received from the second host, reading the sub-portion from the first data storage.

17. The system of claim 16 further comprising:
a determining module to determine that a second portion of the data in the first data storage is unavailable;
a creating module to create a third data storage upon performing the determining, wherein the first host can access the third data storage; and
a causing module to cause each subsequent change to the data in the first data storage to be written to the third data storage.

18. The system of claim 17 further comprising:
a second reading module to read an updated portion from the third data storage if the portion of the data comprises the updated portion.

19. A computer-readable medium comprising:
first receiving instructions to receive a request to read a portion of data from first data storage, wherein a first host can access the first data storage, and the first host cannot access second data storage;
requesting instructions to request a requested portion of a copy of the data in the second data storage from a second host that can access the second data storage;
second receiving instructions to receive the requested portion from the second host; and
reading instructions to read the portion of the data by
reading the requested portion received from the second host, and
when a sub-portion of the portion of the data is not included in the requested portion received from the second host, reading the sub-portion from the first data storage.

20. The computer-readable medium of claim 19 further comprising:
determining instructions to determine that a second portion of the data in the first data storage is unavailable;
creating instructions to create a third data storage upon performing the determining, wherein the first host can access the third data storage; and
causing instructions to cause each subsequent change to the data in the first data storage to be written to the third data storage.

21. The computer-readable medium of claim 20 further comprising:
second reading instructions to read an updated portion from the third data storage if the portion of the data comprises the updated portion.

* * * * *